US009208059B2

(12) United States Patent
Sanders

(10) Patent No.: US 9,208,059 B2
(45) Date of Patent: Dec. 8, 2015

(54) ETL DEBUGGER

(71) Applicant: International Business Machines Corporation, Armonk, NY (US)

(72) Inventor: Martin J. Sanders, Milton Keynes (GB)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 14/028,775

(22) Filed: Sep. 17, 2013

(65) Prior Publication Data

US 2014/0082424 A1 Mar. 20, 2014

(30) Foreign Application Priority Data

Sep. 17, 2012 (GB) .................................. 1216542.9

(51) Int. Cl.
*G06F 11/00* (2006.01)
*G06F 11/36* (2006.01)
*G06F 17/30* (2006.01)

(52) U.S. Cl.
CPC .......... *G06F 11/362* (2013.01); *G06F 11/3636* (2013.01); *G06F 11/3664* (2013.01); *G06F 11/3688* (2013.01); *G06F 17/30563* (2013.01)

(58) Field of Classification Search
CPC ............ G06F 11/3636; G06F 11/3664; G06F 11/3688; G06F 17/30563; G06F 8/30
See application file for complete search history.

(56) References Cited

U.S. PATENT DOCUMENTS

| 7,139,779 | B1 | 11/2006 | Kornelson et al. |
| 2008/0168082 | A1 | 7/2008 | Jin et al. |
| 2010/0082532 | A1 | 4/2010 | Shaik et al. |
| 2011/0137913 | A1* | 6/2011 | Bhatti et al. ................... 707/741 |
| 2012/0284223 | A1* | 11/2012 | Belyy et al. .................... 707/601 |
| 2013/0055197 | A1* | 2/2013 | Balan et al. .................... 717/105 |
| 2013/0132933 | A1* | 5/2013 | Rajaram et al. ............... 717/126 |

FOREIGN PATENT DOCUMENTS

GB 1216542 A1 12/1970

OTHER PUBLICATIONS

Easy Content Migration with EntropySoft, Content ETL Migration Methodology, [online]; [retrieved on Sep. 4, 2008]; retrieved from the Internet, http://www.entropysoft.net/files/content/shared/files/Docs090408_Migration_Methodology_EN.pdf; pp. 1-4.
Zhong, Tao, "Dashboard for ETL Logging/Debugging and Job Control" Source Media website, www.sourcemedia.com; http://www.information-management.com/infodirect/20060908/1062151-1.html; retrieved Sep. 16, 2013; pp. 1-3.
Auther Unknown, "Jaspersoft" Jasper Corporation 2011, http://wwweloquenza.de/fileadmin/content/Jasperoft/pdf/Jaspersoft_ETL—v4—engl_ds.pdf; retrieved Sep. 16, 2013; pp. 1-4.

* cited by examiner

Primary Examiner — Charles Ehne
(74) Attorney, Agent, or Firm — Cantor Colburn LLP

(57) ABSTRACT

A computer-implemented ETL debugger for a data flow associated with an extract, transform and load (ETL) process that provides a user with a graphical representation of an ETL job. The graphical representation includes individualized representations of one or more data sources, one or more data destinations, and one or more transform operations for data flowing from a data source to a data destination. The user selects a subset of the transform operations. In response, the ETL debugger generates an execution script based on the received subset, and may initiate a debug process by executing the generated execution script.

17 Claims, 5 Drawing Sheets

ETL DEBUGGER

PRIORITY

This application claims priority under 35 U.S.C. §119 to Great Britain Application Serial No. 1216542.9 filed Sep. 17, 2012, and all the benefits accruing therefrom under 35 U.S.C. §119, the contents of which in its entirety are herein incorporated by reference.

BACKGROUND

This disclosure relates to electronic data processing and, more particularly, to a computer-implemented debugging for a data flow associated with an extract, transform and load (ETL) process.

Nowadays many organizations generate vast amounts of data in various formats, e.g. different formats are generated at different locations. Nevertheless, there may be a need to centralize the data such that a top-level or organization-wide evaluation of the data can be performed. For instance, a chain of retail outlets may require the centralization of the sales data from the various outlets, e.g. to evaluate or determine business trends, such that appropriate business strategy decisions can be based on the aggregated data. Many other scenarios are of course well-known.

However, it usually is not a trivial exercise to amalgamate the data from the different outlets, for instance because the data is not in the required format for storage in a large central data base or data warehouse, because the data from different sources contain different formats, because the data from a source may contain spurious date entries that need filtering out, and so on.

To facilitate such data centralization, computer-implemented extract, transform and load (ETL) tools have been developed that automatically extract the data from the various sources, transform the data in user-specified format(s) and load the data into the desired target, e.g. a data warehouse. Such tools typically offer an end user a selection of transformation operations, which the end user can select to define the appropriate transformation operation on the data from selected sources in the form of one or more jobs. In addition, in case of an ETL tool capable of parallel processing of some of the ETL tasks, the user may be able to define in such a job the degree of parallelism, e.g. by defining a data partitioning level, the number of pipelines in order to reduce input-output (I/O) to disk and/or nodes to be used by the ETL tool. Such a tool thus typically creates a connection between data sources and targets, in which the source data is manipulated at the transfer stage before forwarding or storing it into its target, e.g. a data warehouse.

Before the jobs can be routinely executed, it may be necessary to ensure that the ETL process behaves as intended. To this end, the user typically needs some form of debug functionality, e.g. to check some of the (intermediate) data generated in the ETL dataflow. An ETL process may allow a user to insert so-called data station operators into a data flow of an ETL process, in which the data station operator represents a staging point in the data flow. The staging is done to store intermediate processed data for the purpose of e.g., debugging. Although this approach gives the user debugging functionality, it is not particularly practical especially in case of large ETL jobs, which means that a user may have to wait for large parts of the job to complete before the staging point captures the intermediate processed data. This in addition may put additional pressure on intermediate data storage, e.g. disk space on the platform used to execute the ETL process, as large amounts of data may have to be temporarily stored to allow the user to check its accuracy prior to moving it to the target destination.

BRIEF SUMMARY

Embodiments of the present invention provide an improved ETL debugger for operating on a data flow associated with an extract, transform and load (ETL) process. The ETL debugger, which may be realized in a computer program product or a system, provides a user with a graphical representation of an ETL job that includes individualized representations of one or more data sources, one or more data destinations, and one or more transform operations for data flowing from a data source to a data destination. The user selects a subset of the transform operations and, in response, the ETL debugger generates an execution script based on the received subset and may initiate a debug process by executing the generated execution script.

BRIEF DESCRIPTION OF SEVERAL VIEWS OF THE DRAWINGS

Illustrative embodiments of the present invention will now be described, by way of example only, with reference to the following drawings, in which.

DETAILED DESCRIPTION

Figure 1:
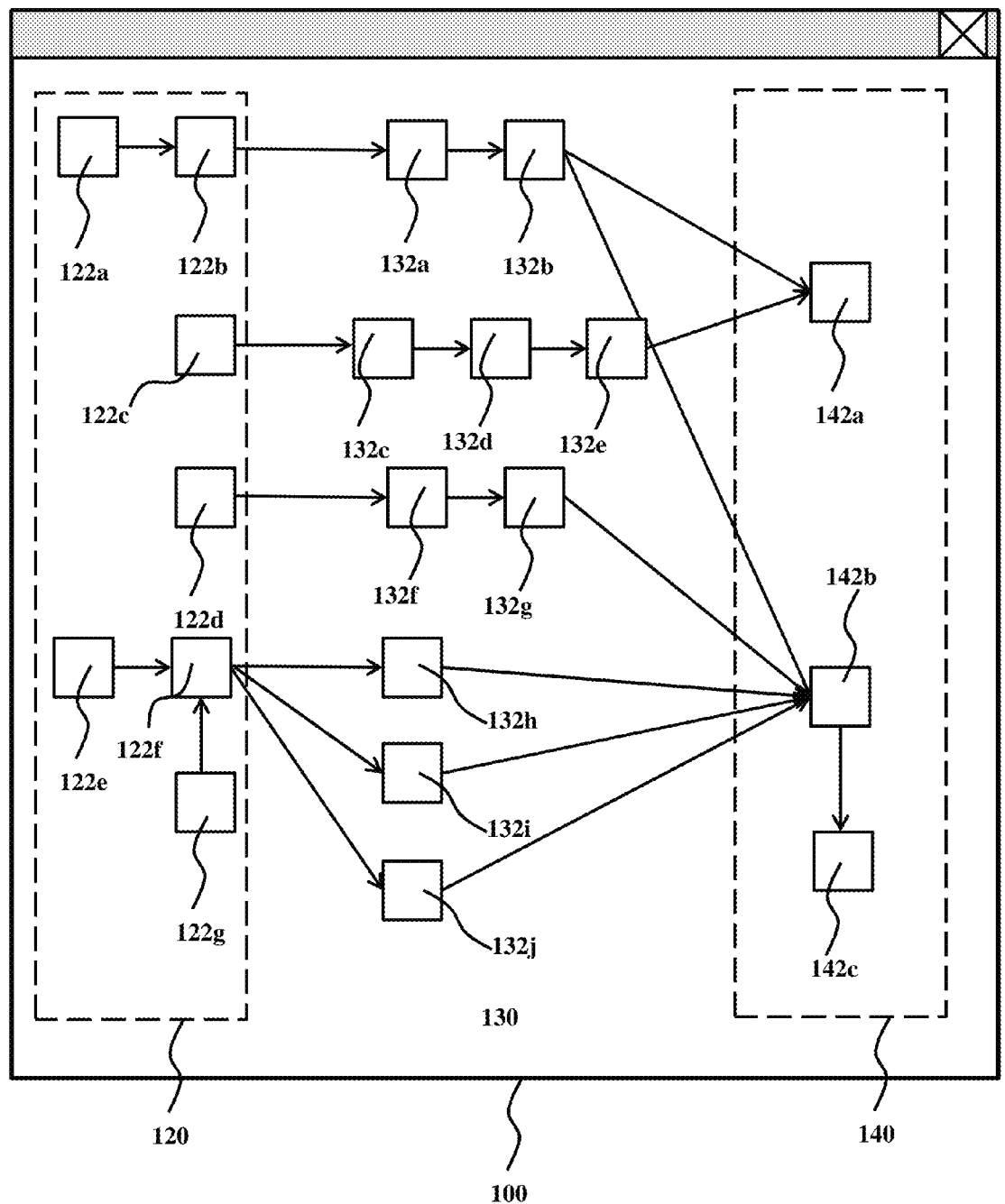
FIG. 1 schematically depicts a graphical representation of an ETL job in accordance with an embodiment.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that the method is a process for execution by a computer, i.e. is a computer-implementable method. The method therefore reflects various parts of a computer program, e.g. various parts of one or more algorithms.

The various embodiments of the invention may be stored on a computer program product comprising a computer-readable storage medium. The computer-readable storage medium may be any medium that can be accessed by a computer for the retrieval of digital data from the medium. Non-limiting examples of a computer-readable storage medium include a compact disk (CD), digital versatile disk (DVD), flash memory card, a universal serial bus (USB) memory stick, a random access memory, a read-only memory, a computer hard disk, a storage area network, a network server, an Internet server and so on.

In the context of the present application, a (computer) system may be a single device or a collection of distributed devices that are adapted to execute one or more embodiments of the invention. For instance, a system may be a personal computer (PC), a server or a collection of PCs and/or servers connected via a network such as a local area network, the Internet and so on to cooperatively execute at least one embodiment of the invention.

Figure 5:
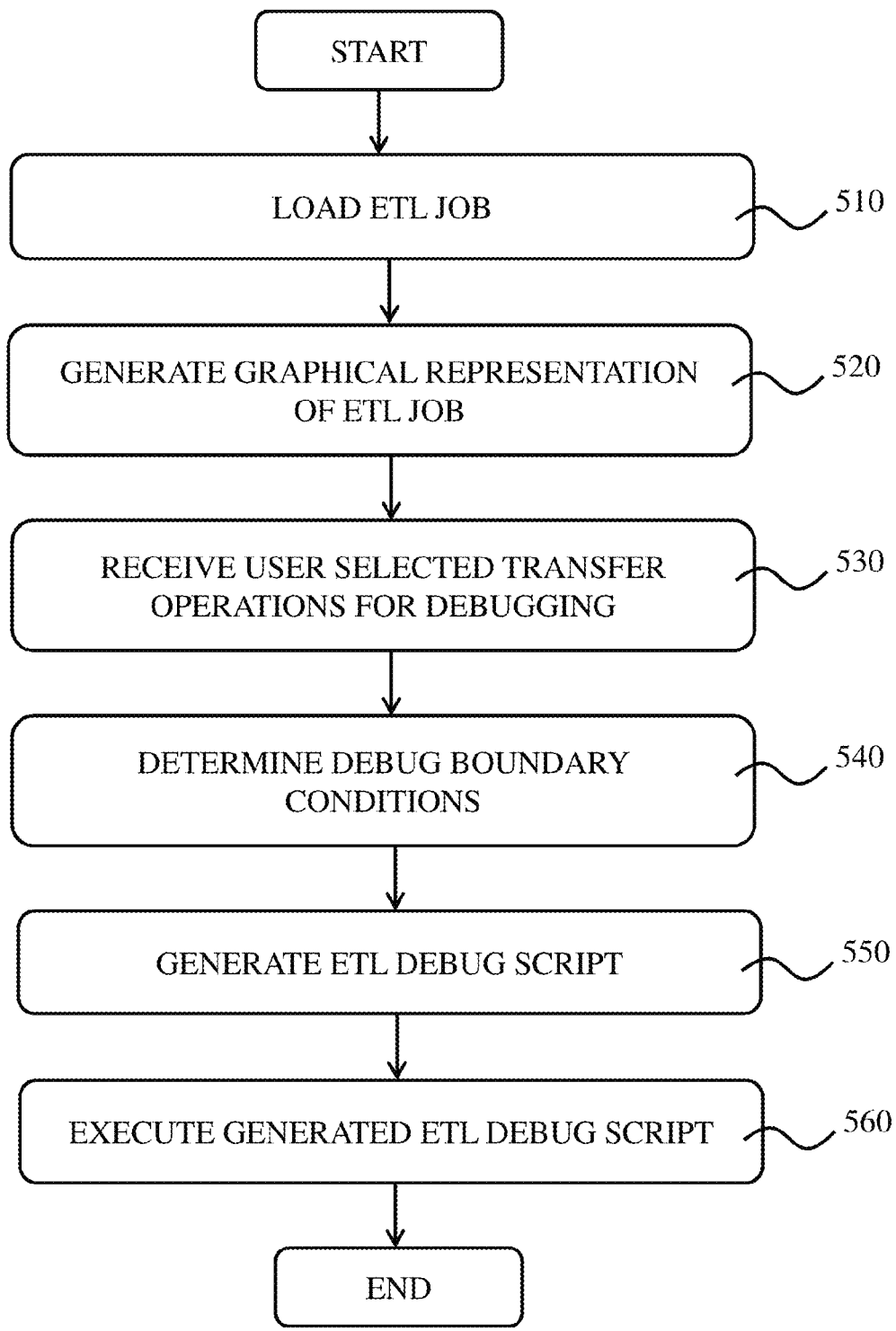
FIG. 5 schematically depicts a flowchart for operating an ETL debugger in accordance with an embodiment.

FIG. 1 schematically depicts a graphical representation 100 of an ETL job flow, whereas FIG. 5 depicts a flowchart of an embodiment of the invention. Embodiments of the invention will be explained with the aid of both figures. The method 500 shown in FIG. 5 commences by the generation and loading 510 of an ETL job (e.g. in the memory of an ETL job processing system). The job may be generated in any suitable manner. Typically, each ETL job includes a plurality of stages, with each stage representing processing logic that is applied to the data extracted from the data sources.

For instance, the processing logic may be applied to data stored in the memory of a ETL processing system, in which data flows between different memory regions, each region representing a different stage, such that a data processing pipeline is created in memory. Several of these pipelines may be defined in different regions of memory, thereby implementing a data partitioning strategy. The amount of pipelining and data partitioning may be selected by the user to negotiate the tradeoff between data processing time and system resource utilization.

The method then commences to the generation 520 of a graphical representation of the ETL job loaded in block 510. An example embodiment of the graphical representation is the aforementioned graphical representation 100 shown in FIG. 1. The graphical representation 100 may for instance be displayed on a screen of a display device (e.g. a computer monitor, the display of a tablet or laptop, etc.). As it is well-known how this type of graphical representation may be generated, this will not be disclosed in further detail for the sake of brevity.

For instance, the graphical representation 100 may include an upstream region 120 in which at least one data source is depicted from which the ETL job is to extract data. In FIG. 1, upstream sources 122a-g are shown by way of non-limiting example. In an embodiment, the upstream sources 122 are all data sources. In an alternative embodiment, some of the upstream sources 122 are transform functions that are upstream from the part of the transform operations to be subjected to a debug investigation. For instance, as shown in FIG. 1, upstream source 122f may be a data merge operation that merges the data from data sources 122e and 122g, whereas upstream source 122b may be a data conversion operation to convert the data from data source 122a into a different format. Transform operations may be assigned to the upstream region 120 automatically, e.g. based on some pre-defined set of rules, or may be assigned to the upstream region 120 by user definition, e.g. by labeling transform functions in the ETL job description that never require debugging. Other heuristics for deciding which transform functions may be assigned to the upstream region 120 will be apparent to the skilled person.

The graphical representation 100 further includes a transform region 130 comprising a number of discrete transform functions 132 that may be selected by the user for debugging purposes. In FIG. 1, ten transform functions 132a-j are shown by way of non-limiting example only. Non-limiting examples of transform functions 132 include:

'Aggregation', which consolidates or summarizes data into a single value, e.g. aggregation of daily sales data into a weekly figure;

'Basic Conversion', e.g. conversion and mapping of data types from source to target columns;

'Cleansing', which resolves inconsistencies and fixes anomalies in source data;

'Derivation', algorithm-based transformation of data from multiple sources;

'Enrichment', combining data from internal or external sources to give additional meaning to data;

'Normalizing', reducing the amount of redundant and duplicated data;

'Pivoting', converting records in an input stream into many records in the appropriate destination table; and 'Sorting', which is sequencing of data based on data or string values.

The graphical representation 100 further includes a downstream or destination region 140, in which at least one data target or destination is depicted into which the ETL job is to load data. In FIG. 1, downstream destinations 142a-c are shown by way of non-limiting example. In an embodiment, the downstream destinations 142 are all data storage targets, e.g. databases, data warehouses and/or data marts. In an alternative embodiment, some of the downstream destinations 142, e.g. downstream destination 142b, are transform functions that are downstream from the part of the transform operations to be subjected to a debug investigation. These downstream transform functions may be assigned to the downstream region 140 in the same manner as previously explained for the upstream region 120.

Next, the user selects the transform functions 132 in the transform region 130 that are to be debugged, which selection is subsequently received in block 530. In an embodiment, the user may select the transform functions 132 in the transform region 130 in the graphical representation 100 in any suitable manner, e.g. by touching the appropriate regions of the screen on which the graphical representation 100 is displayed, by selecting the transform functions 132 of interest using a cursor controlled by e.g. a mouse, keyboard or cursor pad, by speech using speech recognition algorithms and so on.

In an embodiment, the transform region 130 may include a plurality of data transformation pipelines each comprising a plurality of discrete transform functions 132. In this embodiment, a user may select a transformation pipeline instead of individual transform functions 132, in which case all transform functions 132 forming part of the selected pipeline are included in the debug selection.

In yet another embodiment, the ETL process may include a plurality of nodes, in which each node is configured to receive a partition of data from one of the data sources, in which case the user may select at least partition. This selection may automatically include all transform functions 132 associated with the selected partition. Other selection criteria will be apparent to the skilled person.

Figure 2:
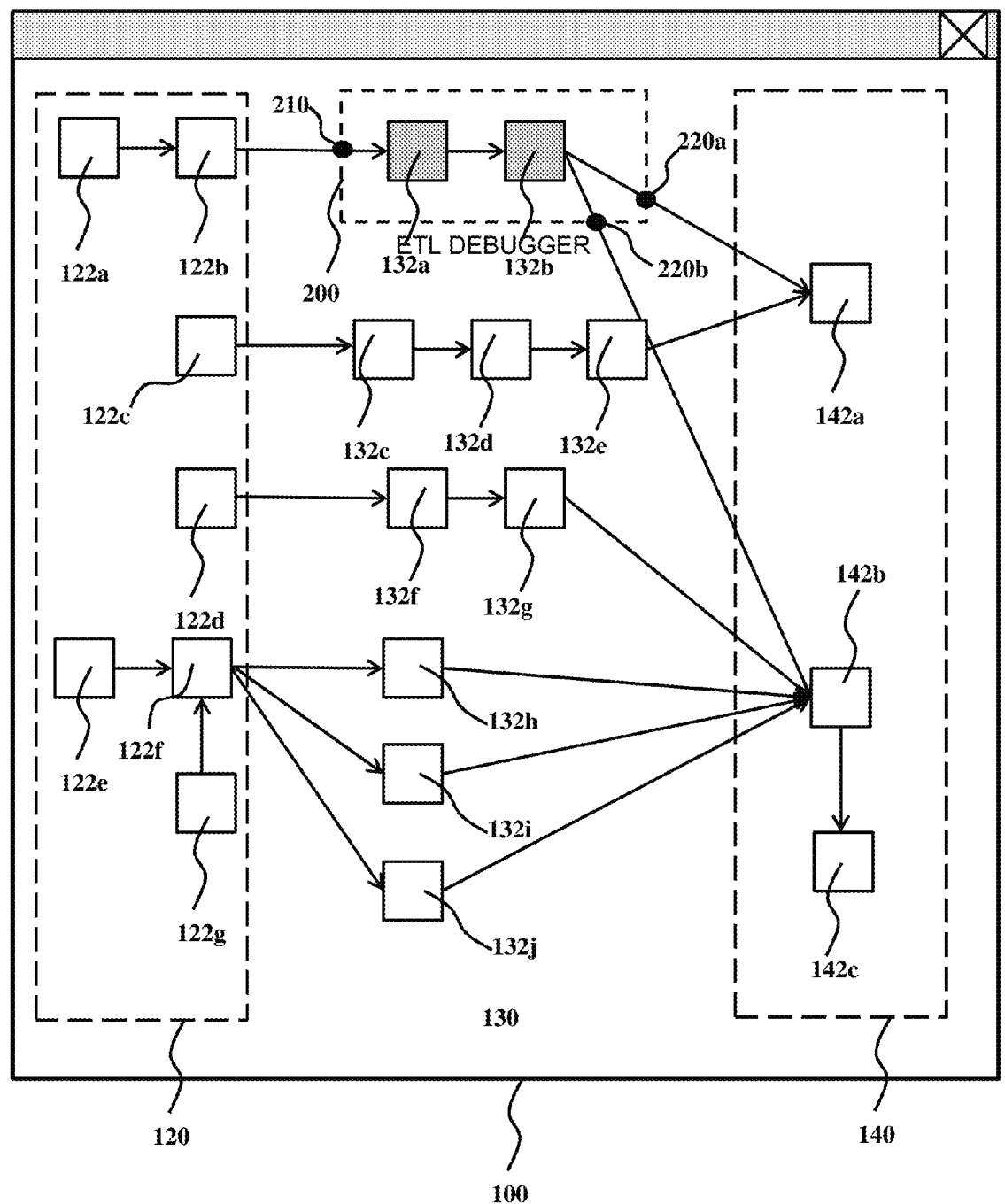
FIG. 2 schematically depicts a graphical representation of an ETL job in which a user has selected transfer operations to be included in a debug process in accordance with an embodiment.

FIG. 2 schematically depicts the graphical representation 100 containing a user selection 200. In FIG. 2, the user has selected transform functions 132a and 132b to debug the part of the ETL job that extracts and transforms the data from upstream sources 122a, 122b and loads the transformed data into downstream target 142a. Boundary nodes 210, 220a and 220b of the user selection 200 are shown for the sake of clarity although it should be understood that the nodes may or may not be displayed in the actual graphical representation 100. However, these nodes symbolize the boundary conditions of the user-selected debug area, which is relevant for the following reason.

In an ETL job, and in particular a pipelined ETL job, data flows in an automated fashion from one or more sources to one or more destinations via a number of data transformation stages, e.g. transform functions 132. However, it may be undesirable to extract data from the actual source 122 and/or to load data into the actual destination 142 during a debug session for various reasons. For instance, there may be a performance penalty involved with using the actual data source, for instance because of its remote location, which can cause a delay in the data retrieval therefrom. Equally, loading data into the data destination can be cumbersome for the same reason, and may complicate interrogation of the transformed data. In addition, it may be undesirable to load unverified data into the destination as this data may be incorrect and may need removing, which may have to be done manually, thus unnecessarily complicating the debug task.

It may therefore be beneficial to alter the boundary conditions of the ETL debug job, e.g. by disconnecting the actual source and/or the actual destination from the data flow.

To this end, the method 500 may optionally include an additional block 540 in which the debug boundary conditions as desired by the user are determined. This may be achieved in any suitable manner. For instance, in an embodiment, the boundary nodes 210, 220a and 220b are displayed in the graphical representation 100, and may be selected by the user in any suitable manner to facilitate the selection of the appropriate boundary condition associated with the selected node. Alternatively, the user may be automatically asked if the user wants to alter some or all of the default boundary conditions.

Figure 3:
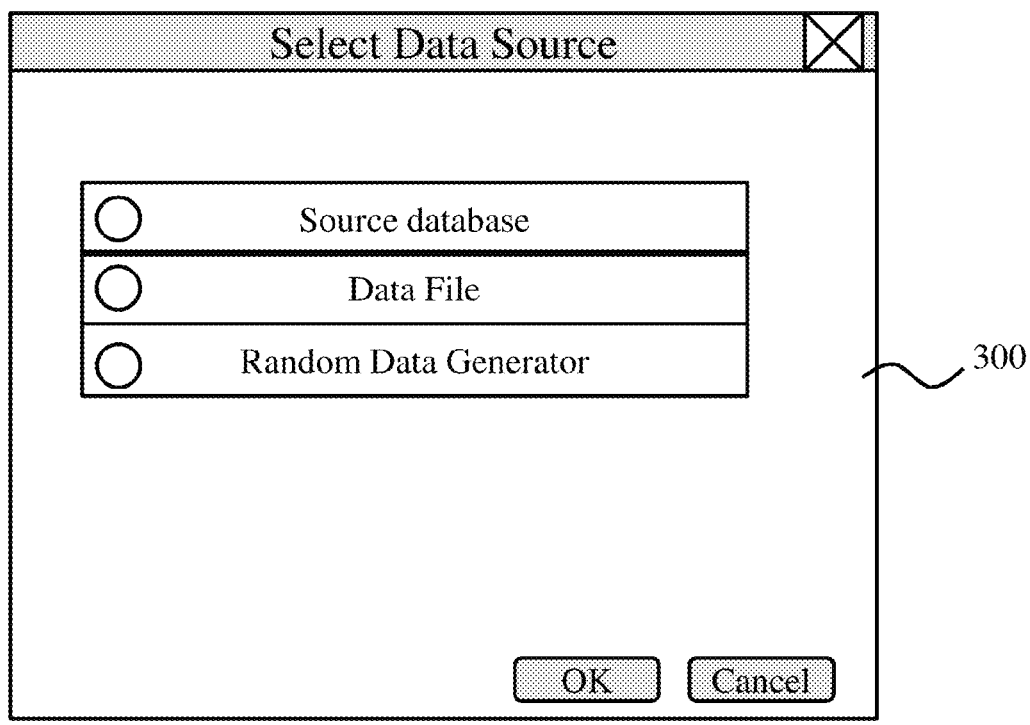
FIG. 3 schematically depicts a dialogue box to allow a user to select a source of the upstream debug data in accordance with an embodiment.

For instance, the user may be presented with a dialogue box 300 as shown in FIG. 3 in which the user can select which data source is to be used in the ETL debug job, e.g. the actual source database, a data file or randomly generated data, in case the user selected boundary node 210 or in any other case the user is expected to specify the input boundary conditions of the ETL debug job. In an embodiment, upon the user selecting a data file as the data source for the ETL debug job, the generation of a data file may form part of the ETL debug job or may be executed prior to the execution of the ETL debug job. In a particularly advantageous embodiment, the user may request the execution of a data file generation script for the generation of debug-only data files, such that the actual debug script only has to include the user-selected transformation functions, e.g. the user-selected transformation functions 132a and 132b as shown in FIG. 2. A data file may be generated in any suitable manner, e.g. by converting data from the source database into the data file. In an embodiment, the system checks if a data file is already present, e.g. generated prior to or as part of a previous debug job, in which case the data file is generated only if it is not yet present.

Figure 4:
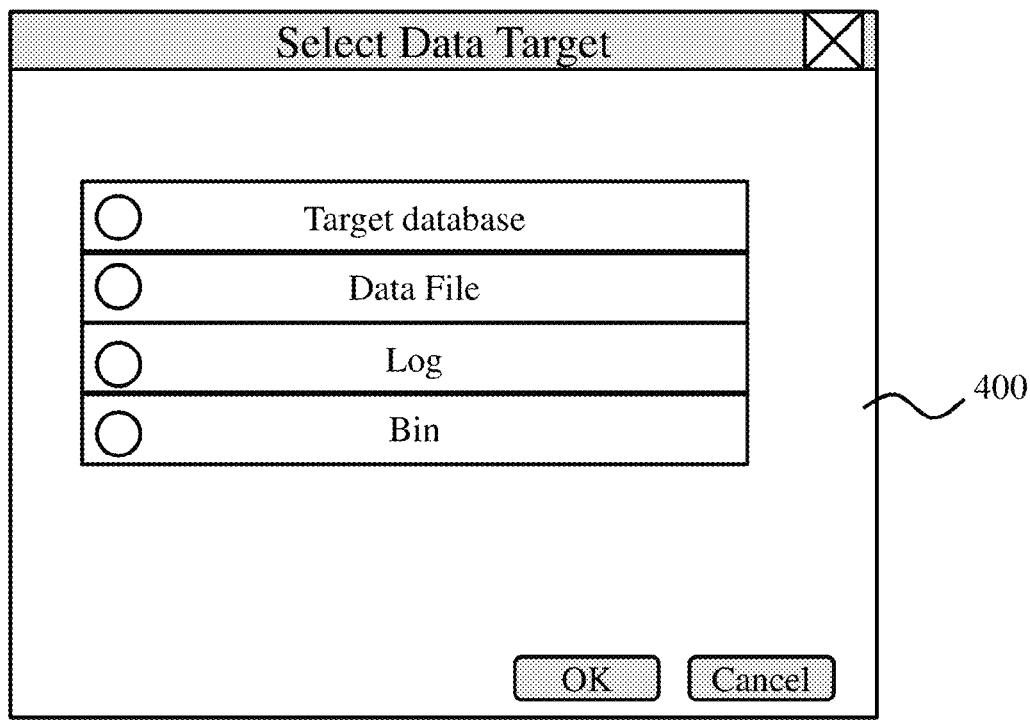
FIG. 4 schematically depicts a dialogue box to allow a user to select a source of the downstream debug data in accordance with an embodiment.

For instance, the user may be presented with a dialogue box 400 as shown in FIG. 4 in which the user can select which data destination is to be used in the ETL debug job, e.g. the actual destination database or data warehouse, a data file, a log file or a bin signaling that the data is to be discarded, in case the user selected boundary node 220a or 220b, or in any other case the user is expected to specify the output boundary conditions of the ETL debug job. It is noted for the sake of completeness that the dialogue boxes 300 and 400 may take any suitable form, e.g. a dialogue pop-up box, a drop-down menu in a menu bar, and so on.

Based on the thus specified transform functions and optionally redefined boundary conditions, the method proceeds to block 550 in which the ETL tool regenerates the execution script for the ETL job such that only the user-selected debug area part of the ETL job can be executed inside a debug environment of the ETL tool. Hence, this ensures that parts of the original ETL job that are irrelevant to the debug process are excluded from execution, such that the desired debug results are available to the user without unnecessary delay and without the generation of unnecessarily transformed data, thus making it easier for the user to analyze the transformed data of interest.

In case of source and/or destination data files being selected as the desired boundary conditions, the files may be located in locations that are uniquely associated with the current ETL job, thus facilitating the easy retrieval of the files by the user.

Finally, the user may trigger the execution 560 of the generated ETL debug script in any suitable manner, e.g. by providing the ETL tool with the appropriate instructions.

Embodiments of the invention may be captured in a computer program product comprising a computer-readable storage medium having computer-readable program code, when executed on a computer, causing the computer to implement the method of these embodiments.

Figure 6:
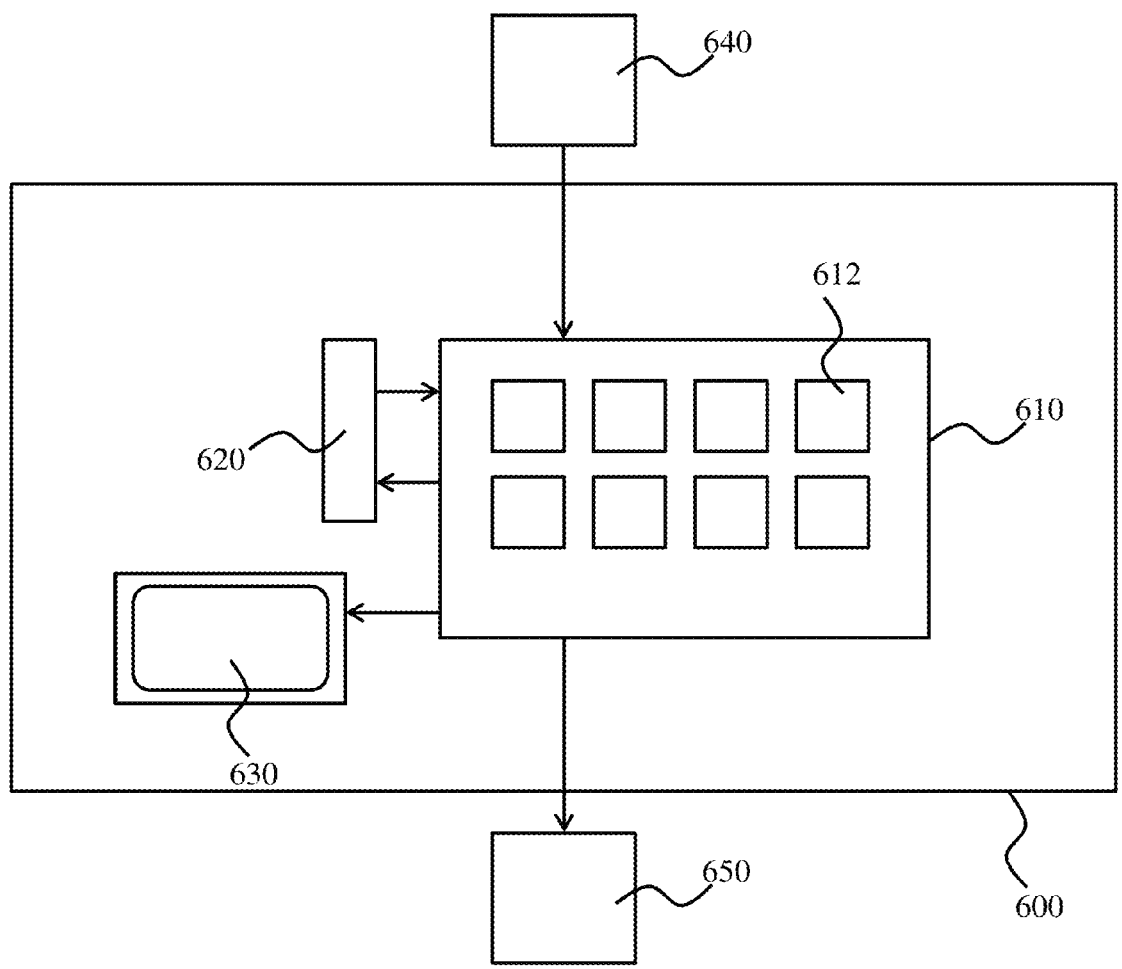
FIG. 6 schematically depicts an example ETL debugger in accordance with an embodiment.

A non-limiting example of a suitable computer system for executing the computer-readable program code is shown in FIG. 6. The computer system 600 includes processor architecture 610, which architecture includes one or more processors 612 adapted to execute the computer program code stored on the aforementioned computer program product. In an embodiment, the processors 612 may be arranged to execute one or more transform functions 132, and may define one or more different stages of a data transform pipeline, and/or one or more data partitioning nodes.

The computer system 600 further includes a memory (not shown), which may be a distributed memory. The memory may for instance be a cache, a dynamic random access memory (DRAM), a read-only memory (ROM), a hard disk, a floppy disk, a magnetic tape, an optical storage medium such as a compact disc (CD) or a digital versatile disc (DVD), and so on. Part of the memory typically stores the computer program code defining the method of one or more of the embodiments of the invention for execution by the one or more processors 612.

In addition, the computer system may include a user interface 620 and a display device 630 for displaying the graphical representation 100 and dialogue boxes 300, 400. The user interface 620 inter alia may be used to select the transform functions 132 in the graphical representation 100 that are to be included in the ETL debug job. The user interface 620 may for instance be a keyboard, a mouse, a keypad, a touchscreen, a voice recognition device, a sensor, a network interface card (NIC), a Voice/video over Internet Protocol (VoIP) adapter, a wireless adapter, a telephone adapter, a dedicated circuit adapter, and so on.

The computer system 600 may further include an output device (not shown), such as a printer, a plotter, a computer screen, a magnetic tape, a removable hard disk, a floppy disk, a NIC, a VoIP adapter, a wireless adapter, a telephone adapter, a dedicated circuit adapter, an audio and/or visual signal generator, a light emitting diode (LED), and so on.

In an embodiment, the computer system 600 acts as an ETL intermediary between at least one data source 640 and at least one data destination 650. In particular, the computer system 600 is connected to the at least one data source 640 and at least one data destination 650 in any suitable manner, e.g. using a wired or wireless network such as a local area network, a wide area network, a 2G, 3G, 4G wireless network, the Internet and so on, and is adapted to execute an ETL tool for extracting data from the at least one data source 640, transforming the data using logic functions implemented by the processor architecture 610 and loading the transformed data into the at least one data destination 650.

The ETL debugger thus provides the user of an ETL tool, e.g. a developer or an end user, with a graphical user interface that depicts the specified ETL job, from which the user can select, e.g. by clicking icons on a screen that represent different stages of the ETL job, portions of the job to be debugged, after which a new job is generated based on the user selection. This has the advantage that a much smaller job, i.e. a job tailor made to the debug requirement, is executed, thus giving the user the debug results with minimal delay, as no parts of the original ETL job that are irrelevant to the debug data of interest need to be executed prior to the generation of the debug data. In addition, embodiments of the invention reduces the burden on the storage capacity of the system on which the method is executed as the amount of intermediate data that needs storing on the system can be significantly reduced in this manner.

The ETL debugger provides the user with a selection menu for selecting the boundary conditions of the selected subset of transform operations; and generating an execution script includes generating an execution script based on the received subset and boundary conditions. Many ETL processes define a pipeline of extract, transform and load operations between the data source and data destination. However, it may be disadvantageous to extract the data from the actual source(s) or write the data to the actual destination(s) during the debug process, for instance because of the required access times may increase the duration of the debug process or because it is undesirable to have unverified transformed data forwarded to its destination. Hence, it is advantageous to allow the user to specify the exact boundary conditions, i.e. the source and destination of the data to be debugged, such that the aforementioned drawbacks can be avoided.

Providing the user with the selection menu may be executed after receiving the user-selected subset of transform operations, such that it can be ensured that the appropriate boundary conditions are offered to the user for selection. The boundary conditions may include a set of replacement options for replacing the data source in the debug process. Replacement options may include a source for generating random data for the selected transform operations; and a source data file pointing to a defined location, such that access of the actual data source(s) of the ETL job can be avoided during debugging. Alternatively or additionally, the boundary conditions may include a set of further replacement options for replacing the data target in the debug process. Further replacement options may include a terminator for discarding the transformed data; a logging target for logging the transformed data to a progress output of the ETL job; and a target data file pointing to a defined location. The data file may be generated from the data source, either on-the-fly or prior to executing the debug process, e.g. by reusing a data file created in a previous debug process, the latter having the advantage of further reducing the duration of the debug process.

In case the ETL process is a parallel process including a plurality of parallel pipelines, each pipeline comprising at least one transform operation, providing a user with a graphical representation of an ETL job may further include providing a graphical representation of each of the parallel pipelines, in which the user selection includes at least a part of a selected pipeline. This further facilitates the selection of a part of an ETL job by the user for debugging purposes. On the other hand, if the ETL process is a parallel process comprising a plurality of nodes, in which each node may be configured to receive a partition of data from one of the data sources, the user selection may include at least one selected partition. This further facilitates the selection of a part of an ETL job by the user for debugging purposes.

An embodiment of the system may include a plurality of parallel processors, in which the processors may define a plurality of data pipelines. This has the advantage of allowing the ETL job or the ETL debug job to complete more quickly. While particular embodiments of the invention have been described herein for purposes of illustration, many modifications and changes will become apparent to those skilled in the art.

As will be appreciated by one skilled in the art, aspects of the embodiments may be realized as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of certain embodiments may take the form of a computer program product embodied in one or more computer readable medium(s) having computer readable program code embodied thereon.

Any combination of one or more computer readable medium(s) may also be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible, non-transitory medium that can store a program for use by or in connection with an instruction execution system, apparatus, or device.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A method of debugging a data flow associated with an extract, transform and load (ETL) process, the method comprising:
   providing a user with a graphical representation of an ETL job, said graphical representation comprising individualized representations of one or more data sources, data destinations, and transform operations on data flowing from a data source to a data destination;
   receiving a user selection of a subset of said transform operations;
   providing the user with a selection menu for selecting one or more boundary conditions of the selected subset of transform operations, the boundary conditions comprising a set of replacement options for replacing the data source in the debug process, the replacement options comprising a source for generating random data for the selected transform operation and a source data file pointing to a defined location; and
   generating an execution script based on the received subset and the boundary conditions.

2. The method of claim 1, further comprising initiating a debug process by executing the generated execution script.

3. The method of claim 1, wherein the providing the user with said selection menu is executed after receiving the user-selected subset of transform operations.

4. The method of claim 1, wherein said selection menu is generated without user intervention.

5. The method of claim 1, wherein said selection menu is generated in response to the user selecting a boundary condition in the graphical representation.

6. The method of claim 1, wherein the method further comprises generating the data file from the data source.

7. The method of claim 1, wherein said boundary conditions comprise a set of further replacement options for replacing the data target in the debug process.

8. The method of claim 7, wherein the further replacement options include:
   a terminator for discarding the transformed data;
   a logging target for logging the transformed data to a progress output of the ETL job; and
   a target data file pointing to a defined location.

9. The method of claim 1, wherein the ETL process is a parallel process including a plurality of parallel pipelines, each pipeline comprising at least one transform operation, and wherein the providing a user with a graphical representation of an ETL job comprises providing a graphical representation of each of the parallel pipelines, wherein the user selection comprises at least a part of a selected pipeline.

10. The method of claim 9, further comprising determining the boundary conditions based on the selected pipeline.

11. The method of claim 1, wherein the ETL process is a parallel process comprising a plurality of nodes, each of said nodes configured to receive a partition of data from one of said data sources, wherein the user selection comprises at least one selected partition.

12. A computer program product for debugging a data flow associated with an extract, transform and load (ETL) process, the computer program product comprising a computer readable storage medium having program code embodied therewith, the program code executable by a computer to perform a method comprising:
   providing a user with a graphical representation of an ETL job, said graphical representation comprising individualized representations of one or more data sources, the one or more data destinations and the one or more transform operations on data flowing from a data source to a data destination;
   receiving a user selection of a subset of said transform operations;
   providing the user with a selection menu for selecting one or more boundary conditions of the selected subset of transform operations, the boundary conditions comprising a set of replacement options for replacing the data source in the debug process, the replacement options comprising a source for generating random data for the selected transform operation and a source data file pointing to a defined location; and
   generating an execution script based on the received subset and the boundary conditions.

13. The computer program product of claim 12, wherein the computer-readable storage medium is selected from a CD, a DVD, a flash memory card, a USB memory stick, a random access memory, a read-only memory, a computer hard disk, a storage area network, a network server and an Internet server.

14. A system for debugging a data flow associated with an extract, transform and load (ETL) process, comprising:
   a data processor and a display, the system configured to perform a method comprising:
   displaying a user with a graphical representation of an ETL job, said graphical representation comprising individualized representations of one or more data sources, the one or more data destinations and the one or more transform operations on data flowing from a data source to a data destination;

receiving a user selection of a subset of said transform operations;

providing the user with a selection menu for selecting one or more boundary conditions of the selected subset of transform operations, the boundary conditions comprising a set of replacement options for replacing the data source in the debug process, the replacement options comprising a source for generating random data for the selected transform operation and a source data file pointing to a defined location; and generating an execution script based on the received subset and the boundary conditions.

15. The system of claim 14, comprising a plurality of parallel processors.

16. The system of claim 14, wherein said processors define a plurality of data pipelines.

17. The system of claim 14, wherein the system comprises a server connectable to a data communication network.

* * * * *